(12) United States Patent
Chang et al.

(10) Patent No.: US 6,598,076 B1
(45) Date of Patent: Jul. 22, 2003

(54) METHOD AND APPARATUS FOR ELECTRONICALLY COMMUNICATING AN ELECTRONIC MESSAGE HAVING AN ELECTRONIC ATTACHMENT

(75) Inventors: Darwin Chang, Cupertino, CA (US); Tony Tong, Fremont, CA (US); Robert M. Chan, San Jose, CA (US); R. Roderick Ang, San Carlos, CA (US)

(73) Assignee: Openshark, Inc., San Jose, CA (US)

( * ) Notice: Subject to any disclaimer, the term of this patent is extended or adjusted under 35 U.S.C. 154(b) by 0 days.

(21) Appl. No.: 09/563,777

(22) Filed: May 2, 2000

(51) Int. Cl.[7] .............................................. G06F 15/16
(52) U.S. Cl. ...................... 709/206; 709/203; 709/204; 709/219; 709/246
(58) Field of Search ................................ 709/200, 204, 709/206, 217, 219, 240, 246; 361/683, 684; 707/10; 379/201; 370/61

(56) References Cited

U.S. PATENT DOCUMENTS

| | | | | |
|---|---|---|---|---|
| 5,406,557 A | * | 4/1995 | Baudoin | 370/61 |
| 5,751,960 A | * | 5/1998 | Matsunaga | 709/206 |
| 5,781,901 A | * | 7/1998 | Kuzma | 707/10 |
| 5,956,688 A | * | 9/1999 | Kokubo et al. | 705/1 |
| 5,974,449 A | * | 10/1999 | Chang et al. | 709/206 |
| 6,092,103 A | * | 7/2000 | Pritsch | 709/206 |
| 6,137,873 A | * | 10/2000 | Gilles | 379/201 |
| 6,324,587 B1 | * | 11/2001 | Trenbeath et al. | 709/310 |

\* cited by examiner

*Primary Examiner*—Frantz B Jean
(74) *Attorney, Agent, or Firm*—Gray Cary Ware & Freidenrich LLP

(57) ABSTRACT

Electronic messages with electronic attachments sent by a device over a communication network, such as the Internet or the World Wide Web, to a receiver is first stored on a server computer. The electronic attachment is opened by a computer having a program that is capable of reading the attachment. The contents of the electronic attachment are then reformatted into a second electronic message using standard protocol, such as HTML and is sent back to the receiver. Thus, the receiver will receive two electronic messages: first, the original electronic mail with the electronic attachment and a second message in which the electronic message is embedded in the message. The advantage is that a user can operate Internet appliances and/or wireless devices without the versatility of a PC and still "read" the electronic attachments to the email as well as retaining the original email with the original attachment for processing by a PC.

18 Claims, 10 Drawing Sheets

ARCHITECTURAL OVERVIEW

MAKO ARCHITECTURE

TIGERSHARK ARCHITECTURE

LEOPARD ARCHITECTURE

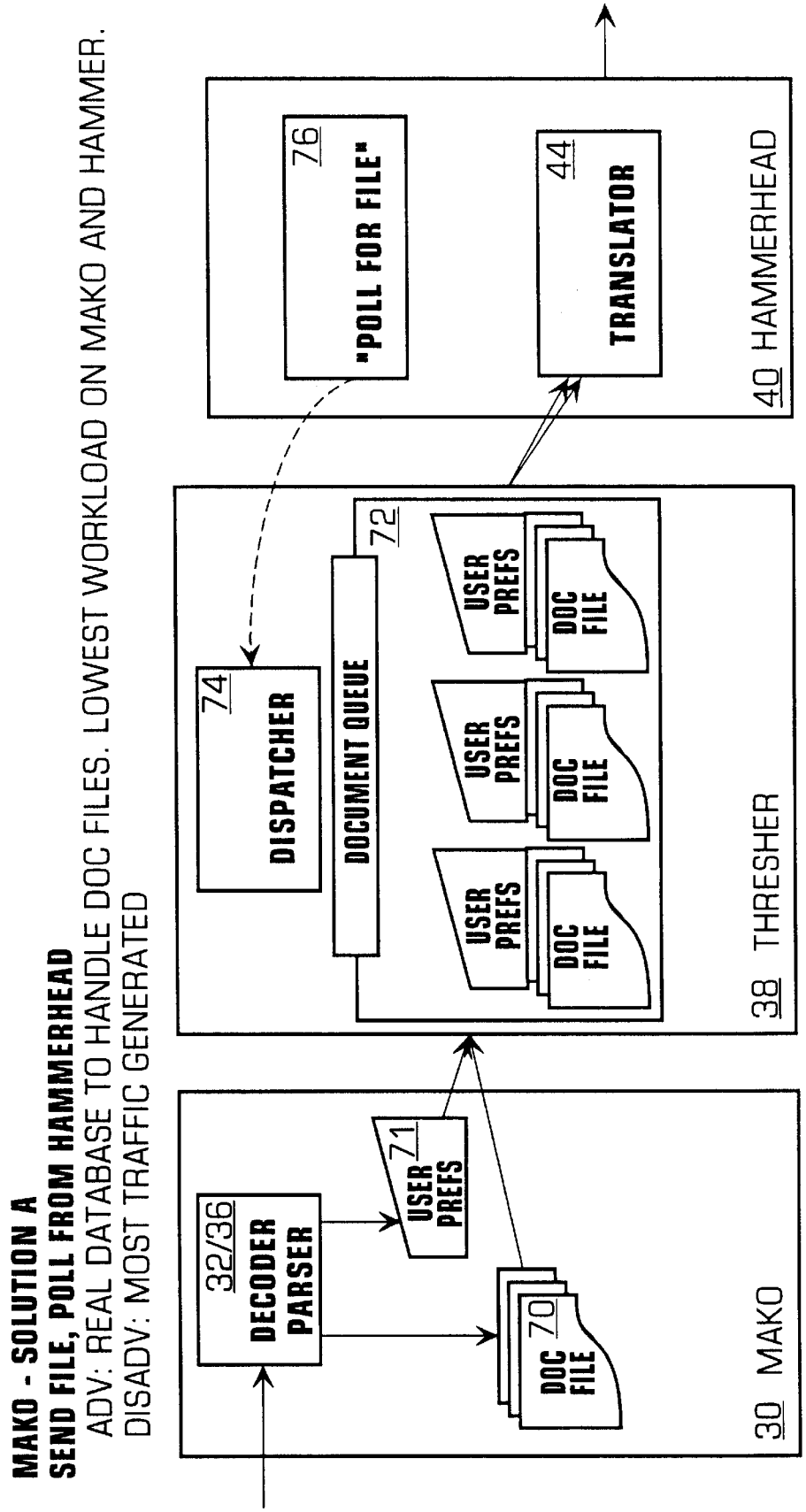

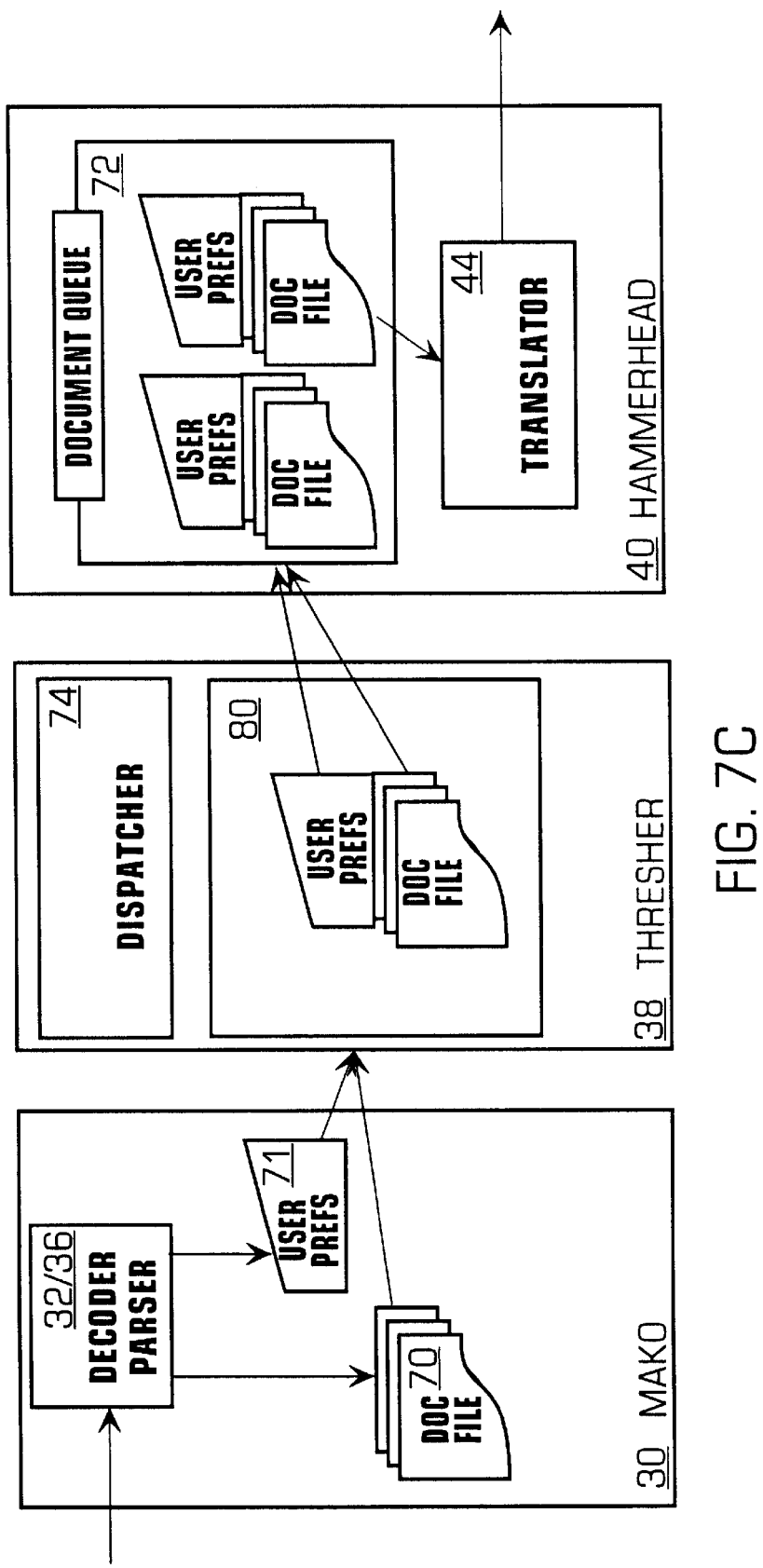

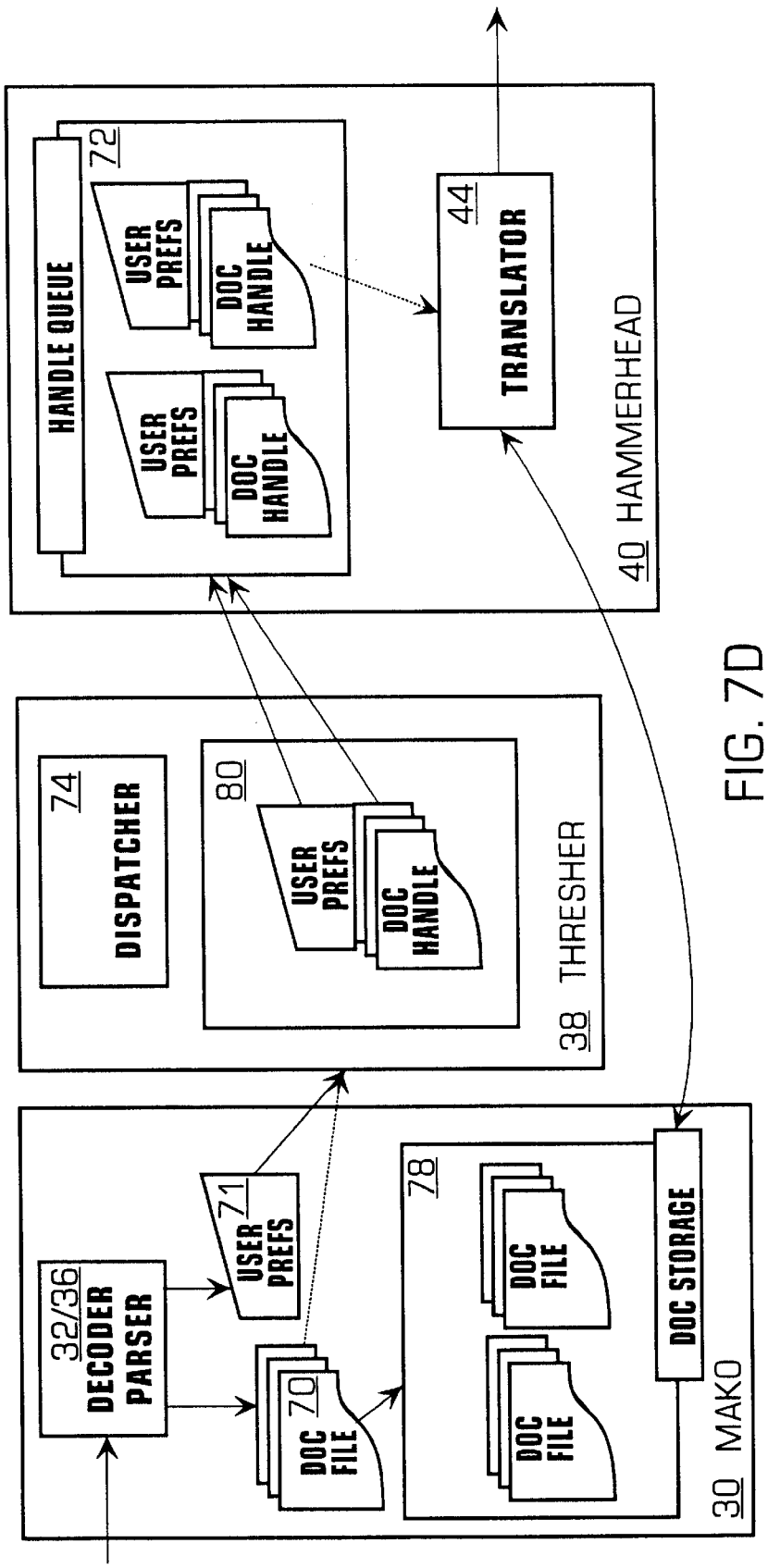

METHOD AND APPARATUS FOR ELECTRONICALLY COMMUNICATING AN ELECTRONIC MESSAGE HAVING AN ELECTRONIC ATTACHMENT

TECHNICAL FIELD

The present invention relates to a method and apparatus for electronically communicating between a device sending an electronic message having an electronic attachment to a receiver and more particularly, wherein the electronic message is sent by the device over a communication network to a server computer for storage thereon and is subsequently translated into a format which can be received by the receiver as a second electronic message with the electronic attachment embedded within the second electronic message.

BACKGROUND OF THE INVENTION

Electronic messaging or email is well known in the art. It is a form of electronically communication between a sending device and a receiver. Typically, in the prior art, the sending device has been a computer with the receiver al so a computer. Thus, email communication has also entailed the use of an electronic attachment in which a file is attached to the email and sent by the sending device to the receiving device. The file may contain images, text, audio/video data, spreadsheet or other forms.

The email with the attachment is typically sent over a private network (Intranet) or a public communication network (Internet) and stored on a server computer having a storage device. The receiving computer then retrieves the email with the attachment. In order to "open" the attachment, the receiving computer must have the necessary software to open the electronic attachment. Examples of software to open electronic attachment s include word processing programs, such as programs having *.doc extension, or spreadsheet programs having the *.xls extension, or other programs having the *.pdf extension etc. These programs, resident on the receiving computer, are then started and then can be used to open the electronic attachment, which is attached to the email. In this manner, the receiver at the receiving computer can then review the electronic attachment.

Increasingly, emails are also being used to send electronic messages from one location to a wireless location. A wireless device can be a telephone, pager, or a PDA (personal digital assistant). Although many of these wireless appliances have adopted the wireless application protocol or WAP which is a widely adopted programming language used to format text and other information from a sending device for delivery to the small screen on the wireless device, these wireless devices do not have the complexities of a computer to execute different types of programs in order to open the myriad of possible electronic attachments attached to an email. Thus, while a sending device may send an email with an electronic attachment via the Internet or Intranet, in the increasing mobile environment, it is uncertain that a computer having stored programs, which can open the attachments, will receive the email. Wireless devices will increasingly receive such device and have the need to open the electronic attachment attached to the email.

Heretofore, one prior art solution to the problem of insuring that the receiver can receive the electronic attachment is for the sending device to initially send the email along with the electronic attachment in the protocol of the receiving device. Thus, rather than sending the electronic attachment as an "attachment", the data within the attachment is converted into the format which can be received by the "expected" receiver. This method suffers from the drawback that the true caliber of the attachment may be lost in the conversion process. Secondly, it assumes that the sending device or the sender knows precisely the protocol of the receiver. Finally, it is a burden on the sender to convert the format; hence it is burdensome and less desirable.

Another heretofore method is the use of plug-ins for browsers. The WAP protocol prescribes in essence a "mini" browser. The wireless device can have various "plug-ins" loaded which then can open the electronic attachment. The problem is that the receiver must have the myriad of possible plug-ins available at its disposal in order to select the proper one to be able to translate the attachment.

Hence, it is desirable to find a solution to the foregoing problem of insuring that a receiver can open an email with virtually any type of electronic attachment attached thereto.

SUMMARY OF THE INVENTION

Accordingly, in the present invention, a method of electronically communicating between a device sending an electronic message having an electronic attachment to a receiver is disclosed. The electronic message is sent by the device over a communication network to a server computer for storage thereon. The receiver operates a software to access the server computer to receive the electronic method. The method comprises retrieving the electronic message with the electronic attachment by a computer. The computer opens the electronic attachment and sends a revised electronic message with the electronic attachment in the revised electronic message to the receiver.

The present invention also relates to an electronic system to accomplish the foregoing. Finally, the present invention also relates to a computer readable media for executing the aforedescribed method on a computer.

BRIEF DESCRIPTION OF THE DRAWINGS

FIG. 7a is one embodiment of the processing of information from the first portion shown in FIG. 3 to the second portion shown in FIG. 4.

FIG. 7c is a third embodiment of the processing of information from the first portion shown in FIG. 3 to the second portion shown in FIG. 4.

FIG. 7d is a fourth embodiment of the processing of information from the first portion shown in FIG. 3 to the second portion shown in FIG. 4.

DETAILED DESCRIPTION OF THE DRAWINGS

Figure 1:
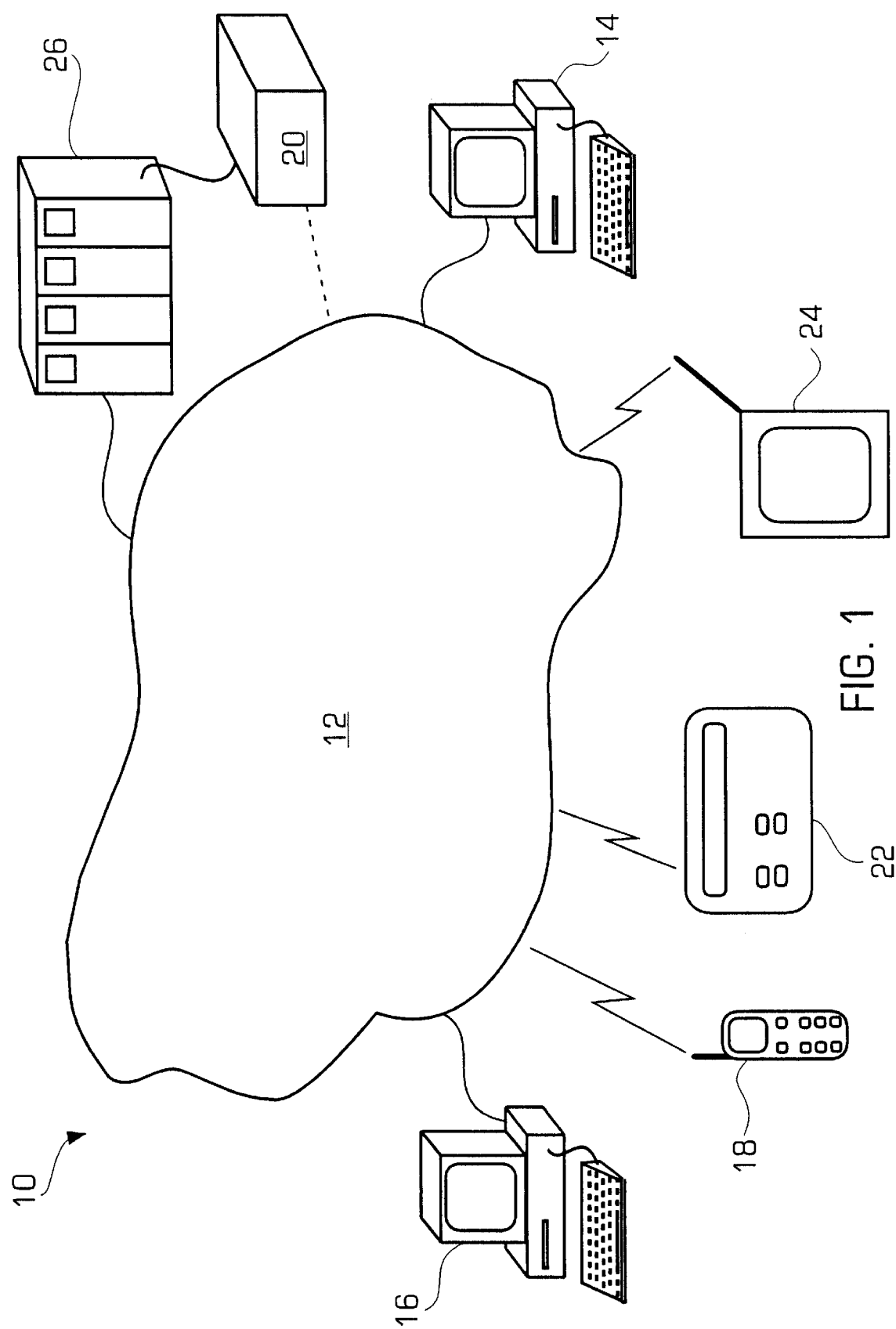
FIG. 1 is a schematic diagram of a plurality of devices capable of communicating with one another over a communication network by sending electronic messages having electronic attachments which are stored on a server computer for storage thereon.

Referring to FIG. 1 there is shown a schematic block diagram of a communication system 10 in which the apparatus 20 of the present invention can operate and in which the method of the present invention can likewise be used. The system 10 comprises a communication network 12 such as a public communication network, e.g. the World Wide Web or the Internet, or a private communication network such as an Intranet. The network 12 has a plurality of devices connectable thereto for communication therewith. Thus, for example, a first computer 14 and a second computer 16 are connectable to the network 12 for communication therewith. Each of the computers 14 and 16 can communicate with one another by sending an electronic message having an electronic attachment to the other. In addition, other devices such as wireless device in the nature of a wireless telephone 18 or a wireless pager 22 or a wireless PDA (personal digital assistant) 24 can also be connected to the network 12.

Each of the devices 14, 16, 18, 22 and 24 can communicate with one another by sending or receiving an electronic message. The messages are sent to the communication network 12 and are stored on a server computer 26. The messages also may have an electronic attachment attached thereto. The method and apparatus of the present invention is intended to operate in the environment of translating or decoding the electronic attachment to the electronic message.

As described previously, in the prior art, when a first computer 14 sends an electronic message with an electronic attachment to a second computer 16, the second computer 16 because it is a general purpose computer, can "open" or launch or run an appropriate application software to "open" the electronic attachment. Thus, for example, if the first computer 14 attaches a spread sheet file, or a database file, or a pictorial file, to an electronic message all of these can be received by the second computer 16 and using a spreadsheet application program, or a database application program, or an image processing program, the second computer 16 can "open" the electronic attachment. The problem as described heretofore is as wireless devices, e.g. 18, 22 and 24, proliferate and as more "Internet appliances" are connected to the communication network 12, which are not in themselves in the nature of a computer with application programs that can be launched or opened, it becomes increasingly difficult for these devices, to "open" the electronic attachments which are attached to electronic messages.

Although the wireless application protocol (WAP) attempts to standardize the means by which electronic message can be viewed by one another on a wireless device, there has been no standard heretofore established for the wireless devices 18, 22, and 24 to open the electronic attachments.

All of the electronic messages with electronic attachments are as previously described, stored on a server computer 26. Even the wireless devices 18, 22, and 24 would have the capability, of retrieving the electronic message from the server computer 26 using the "built-in" software which is in the nature of a browser such as a HTML browser, albeit of a low versatility type.

In the method and apparatus of the present invention, electronic messages with electronic attachments that are stored on the server computer 26 are first retrieved by a translation computer 20. The translation computer 20 similar to the first or second personal computer 14 or 16 respectively, has a plurality of application programs stored thereon and can select the particular application program to open the particular electronic attachment to the emails stored on the server computer 26. Once the translation computer 20 has opened the electronic attachment, the translation computer 20 thereafter sends a second electronic message with the electronic attachment as a part of the second electronic message to the receiver device. This, of course, means that the second electronic message is also stored on the server computer 26. Thus, when, e.g. a wireless device such as the cellular phone 18 retrieves all of its electronic messages from the server computer 26, the telephone 18 would first receive the original electronic message with the electronic attachment and a second electronic message with the electronic attachment embedded in the message itself. This has the advantage that in the event the user of the telephone 18 used the second computer 16 to retrieve the email, the original attachment would still be present. At the same time, if the user used an Internet appliance or a WAP device, the "converted" electronic attachment can be viewed on the Internet appliance or the WAP device.

Figure 2:
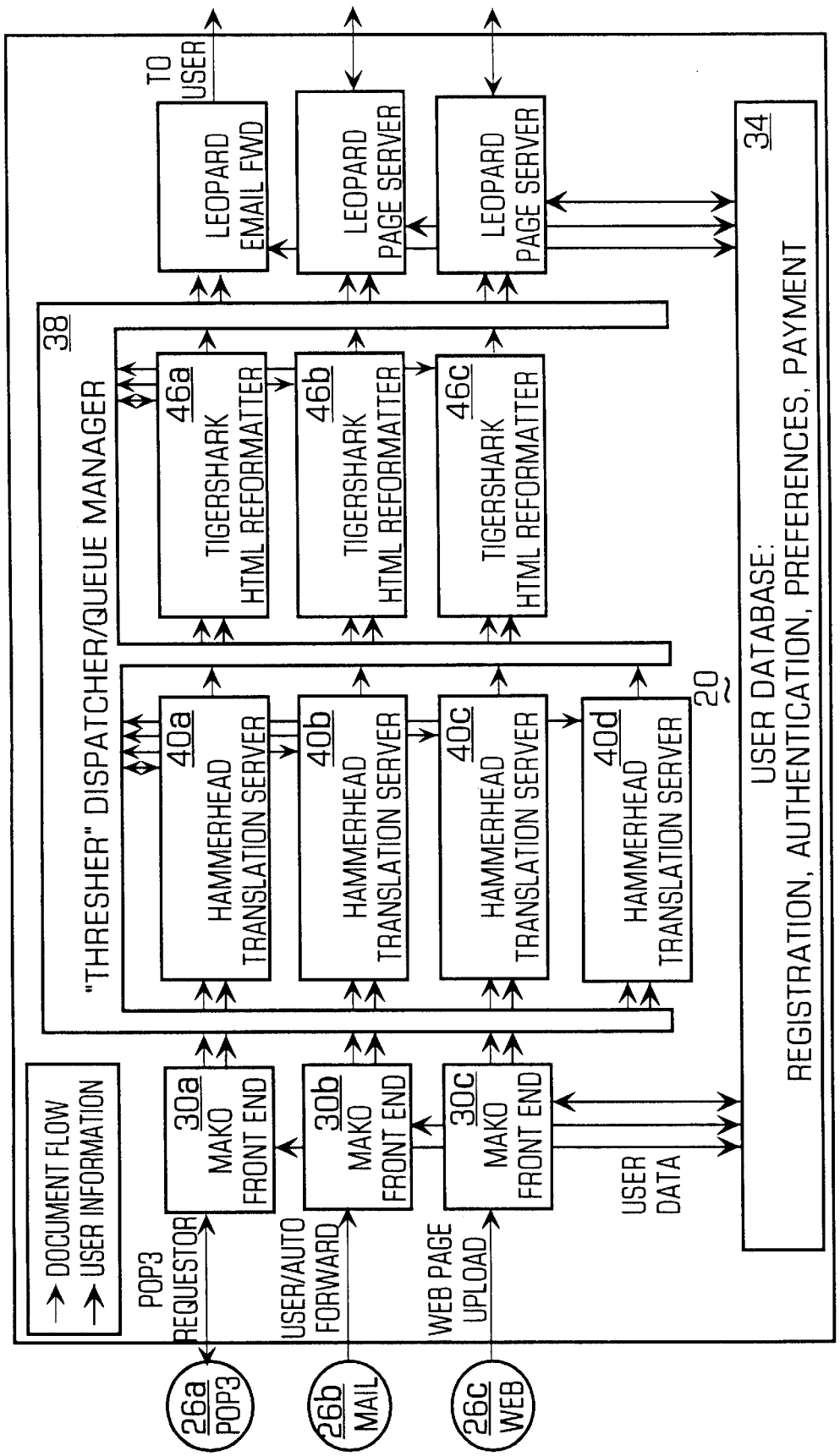
FIG. 2 is an architectural block diagram of the processing flow for the system of the present invention.

Referring to FIG. 2 there is a schematic diagram flow of the translation of the electronic messages with electronic attachments thereto that are received by the translation computer 20 and processed thereby. As previously described, the translation computer 20 can comprise a plurality of computers with each dedicated to opening or executing application programs of one particular type. Thus, the method and apparatus of the present invention is highly scalable in that, for example, as more electronic mails with spreadsheet attachments are received, additional translation computers having the spreadsheet application program that can be launched can be added to the system.

Figure 3:
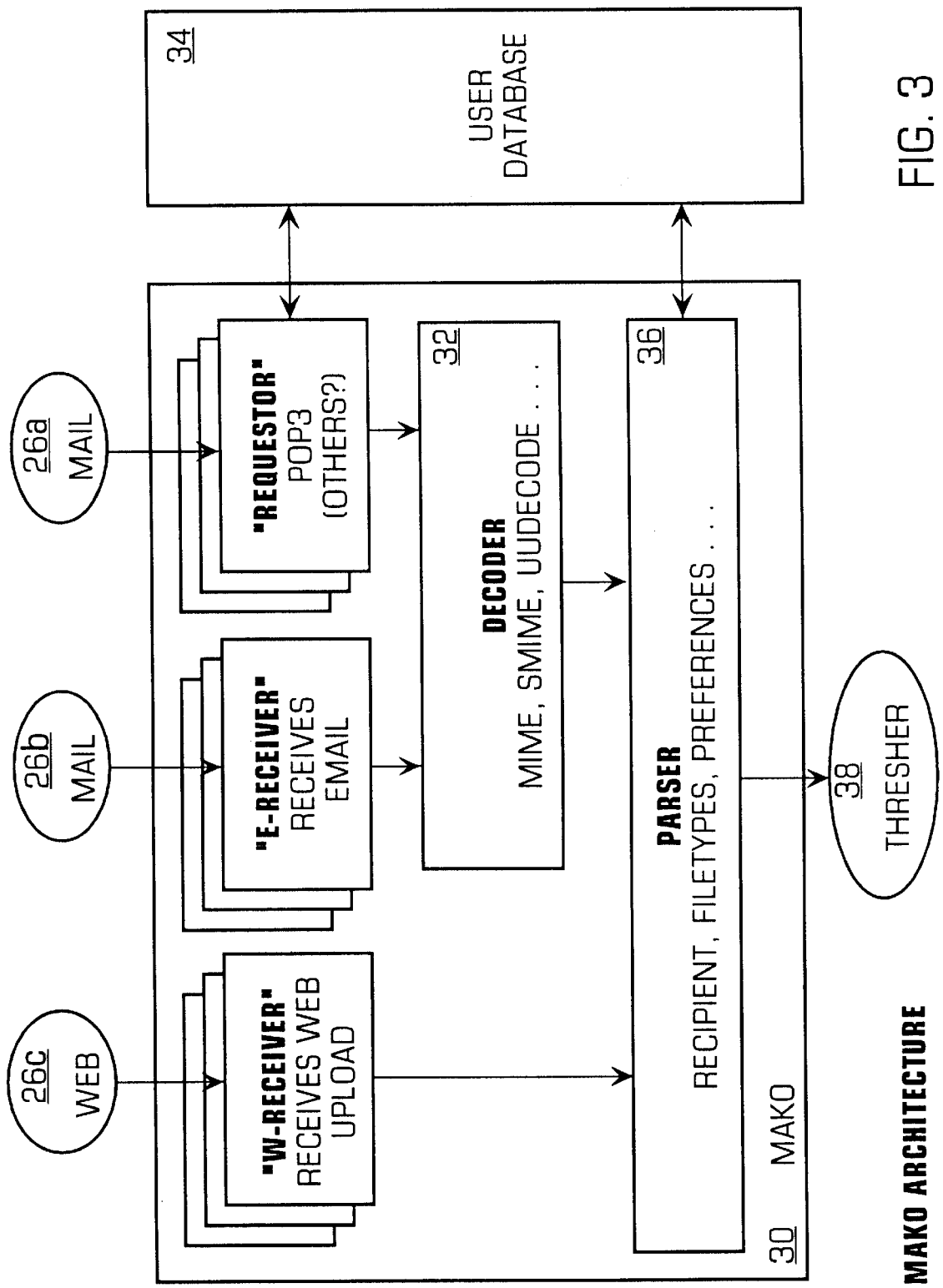
FIG. 3 is block diagram of a first portion of a system shown in FIG. 2.
Figure 4:
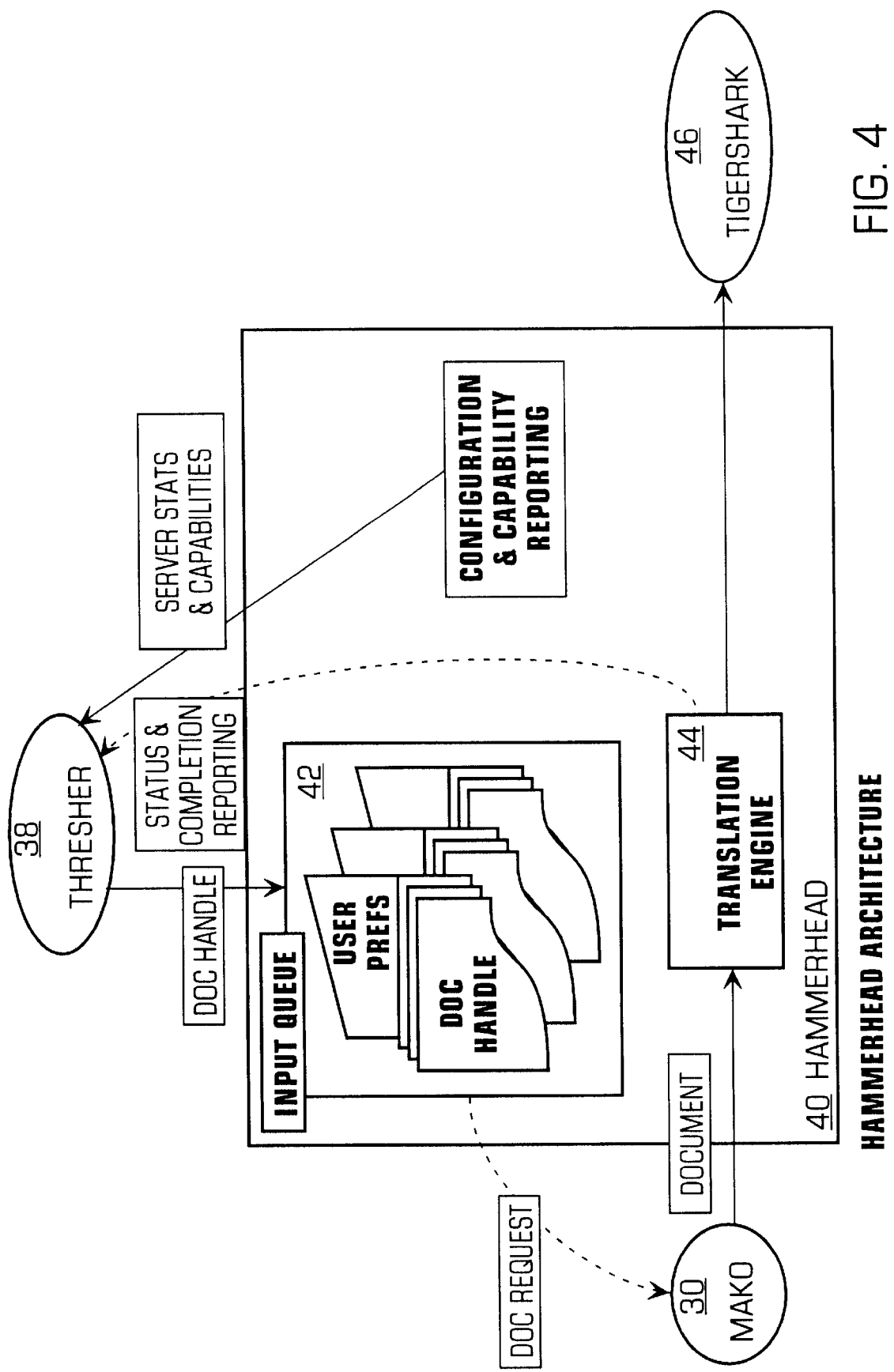
FIG. 4 is a block diagram of a second portion of the system shown in FIG. 2.

The electronic mails with electronic attachments can be from a number of sources. First, they can come from a POP3 mail server 26a. Such type of server is well known in the art and is used to refer to a "forwarded" type of mail from a remote mail server computer. In addition, the translation computer 20 can receive mail from a conventional mail server, which is, e.g. wireless device 18's home mail server. Finally, the mail can be from a web page upload 26c server. All of the emails are then supplied to a first processor 30. It should be noted that although the term "processors" is used to designate processor 30, it need not be a physical processor but simply refers to the act of processing and can be simply software that executes the function. The server 30, shown in FIG. 3, simply receives the email from the various sources 26(a–c). If the email is from a POP3 mail server or is from the wireless device 18's home mail server, then the mail is sent to a decoder 32.

Every e-mail sent over the Internet 12 is encoded or packed in a number of popular formats, such as MIME encoded or UU encoded. The e-mail has a header which describes the message origination and destination, as well as key fields such as date, subject, copy list, blind copy list, and ASCII text message and attached file or files. The decoder separates these portions of the e-mail message and then passes them to the parser 36. In addition, the processor 30 interfaces with a user database 34. The user database 34 interfaces with the user of the wireless device 18 and provides "front-end" processing such as registration, authentication, preferences and payment. In addition, the user database 34 also receives information from the hardware device, e.g. wireless telephone 18, of the hardware characteristics of the receiver. Thus, the receiver 18 may indicate as its registration that it has XX number of line of display with YY number of pixels resolution and whether or not it has color, etc. The user database 34 also interfaces with the processor 30 to indicate where the POP3 mail server is located from which the mails are forwarded. After the emails from the POP3 server 26a and from the regular mail server 26b are decoded by the decoder 32, they along with the email from the web receiver 26 are then parsed by the parser 36.

The parser 36 searches through the various portions of the e-mail that have been decoded by the decoder 32, and stores the relevant portions in a file store server and database server. Specifically, the attached electronic file(s) are stored as files in the file store server and the corresponding descriptive information, such as file type, From:, To:, Date: etc. is then stored in the database server. After the email messages have been parsed by the parser 36, they are then sent to the second processor 38.

The second processor 38 is simply a dispatcher/queue manager. The second processor 38 determines which of the translation processors 40(a–e) is chosen to perform the translation of the electronic attachment. Various embodiments of the second processor 38 are shown in FIGS. 7(a–d). After the electronic message with the electronic attachment is processed by the parser 36, the second processor 38 places the electronic message with the electronic attachment in a queue within the third processor 40. The documents in the queue 42 await for an appropriate resource to become available within the third processor 40. As a translation engine 44 becomes available, for the particular type of the document that is attached as an electronic attachment, the document in the queue 42 is then sent to be translated by the translation engine 44. Once the translation engine 44 has "opened" the electronic attachment, it is then sent to the fourth processor 46 with a status report sent back to the second processor 38 notifying the second processor 38 of the completion of the translation or the opening of the document. In the preferred embodiment, the fourth processor 46(a–c) takes each of the electronic attachment and reformats it in the conventional universally accepted format of HTML and embeds it as another electronic message.

Figure 5:
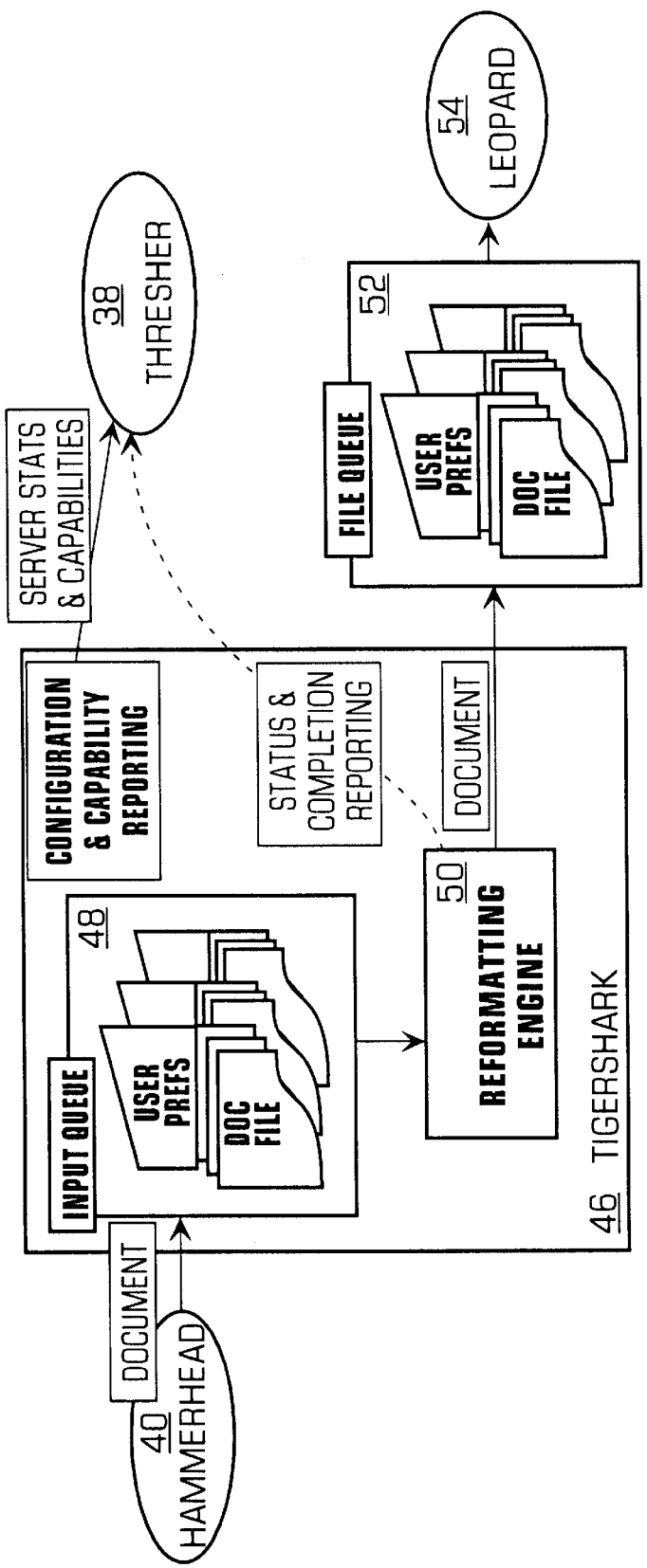
FIG. 5 is a block diagram of a third portion of the system shown in FIG. 2.

Referring to FIG. 5 there is shown a schematic block diagram of the flow of processing from the third processor 40 to the fourth processor 46. As each opened electronic attachment is received by the fourth processor 46, it is placed on the queue 48. A reformatting engine 50 takes each electronic attachment and formats it into, in the preferred embodiment, the universal format of HTML (hypertext markup language). In the preferred embodiment, the HTML version is the lowest version such that virtually all known devices connectable to the communication network 12 can then open the electronic message having information embedded in that version of HTML. From the reformatting engine 50 of the fourth processor 46, the reformatted electronic message, which is the electronic attachment opened and embedded in a new electronic message, is then sent into a queue 52 for the fifth processor 54 to process. After each electronic attachment is reformatted, the second processor 38 is notified.

Figure 6:
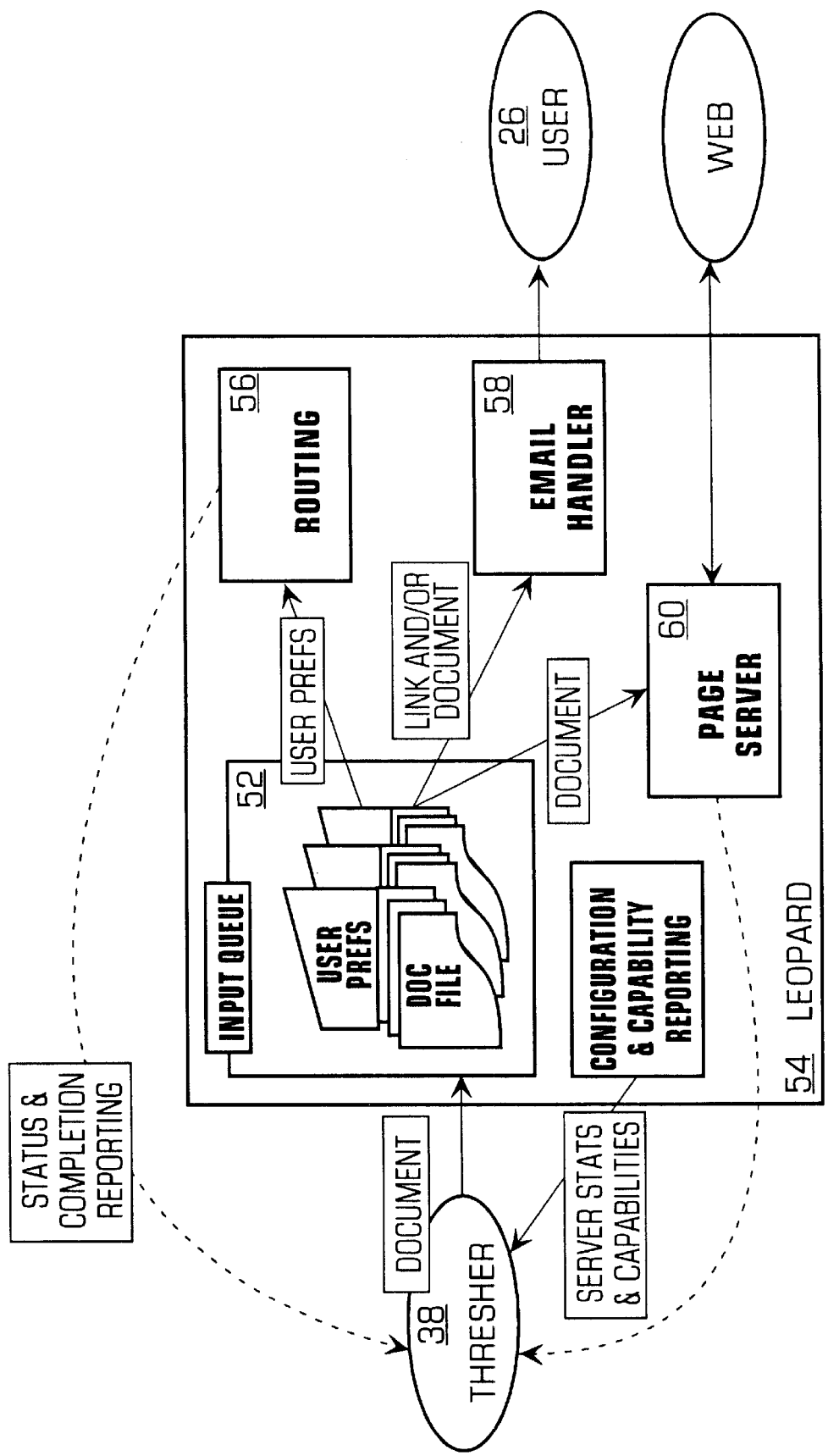
FIG. 6 is a block diagram of a fourth portion of the system shown in FIG. 2.

As shown in FIG. 6, once the new electronic messages are placed in the queue 52, they are then routed to router 56 or to an email handler 58 to be sent to the same intended receiver which is stored on the mail server 26. In addition, if the new electronic message is to be sent to a page server, there may be a page server processor 60 to which the electronic message, which has the embedded electronic attachment, is routed. After the electronic message with the electronic attachment embedded therein is routed to the appropriate source, the second processor 38 is then notified.

Referring to FIG. 7a there is shown a first embodiment of the flow of processing of the electronic attachment from the first processor 30, to the second processor 38, to the third processor 40. In the first embodiment shown in FIG. 7a, the email with the electronic attachment attached thereto is decoded and parsed with the electronic attachment 70 separated therefrom, by the first processor 30. Thereafter, the separated electronic attachment 70 is then sent to the second processor 38 to be stored in a database 72 along with user preferences 71. From the second processor 38, the document with the user preference 71 is sent to the translation engine 44 in the third processor 40. Once the document is processed by the third processor 40, a polling device 76 of the third processor 40 notifies the dispatcher 74 of the second processor 38 of the completion of the task. The dispatcher 74 then sends a second electronic attachment from its database 72 to the translation engine 44 in the third processor 40 for further processing.

Figure 7B:
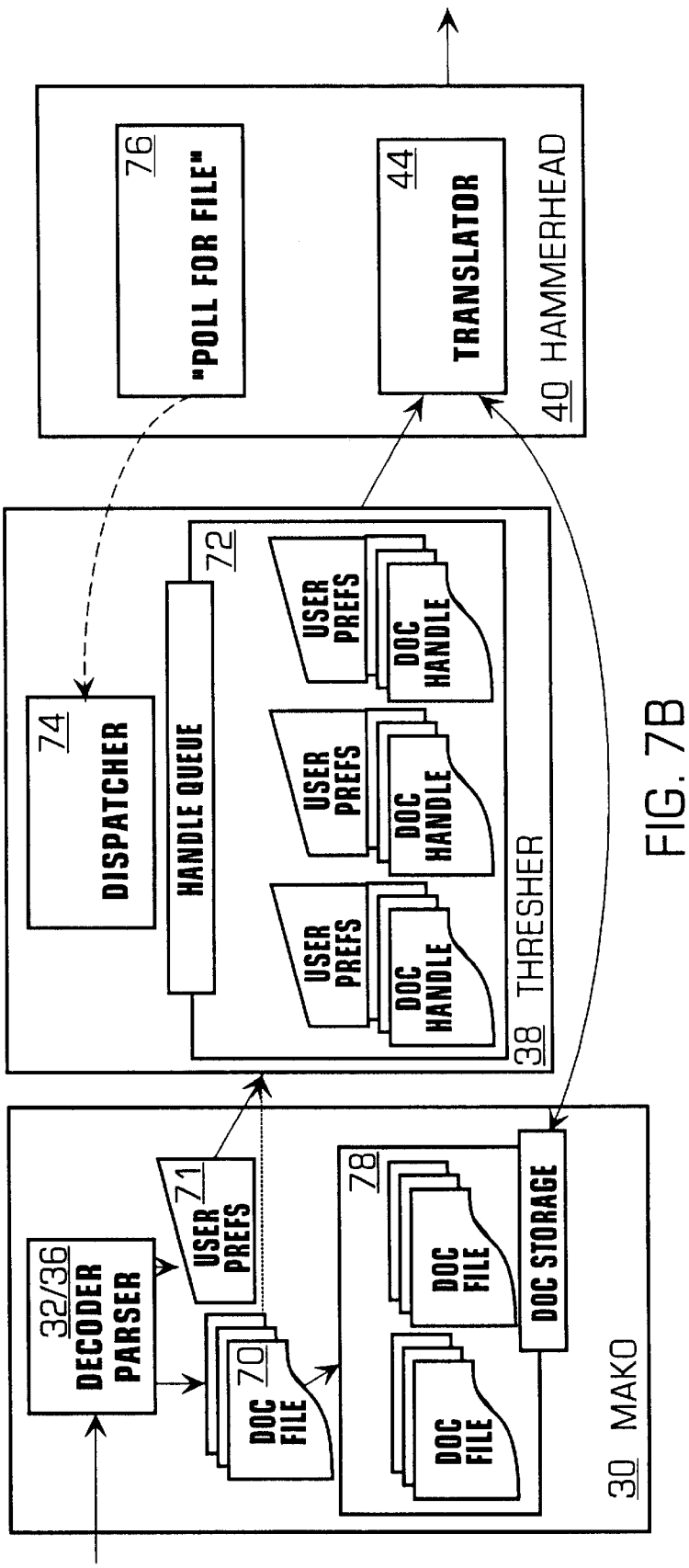
FIG. 7b is a second embodiment of the processing of information from the first portion shown in FIG. 3 to the second portion shown in FIG. 4.

Referring to FIG. 7b there is shown a second embodiment of the flow of the processing of the electronic attachment. The electronic mail with the electronic attachment is first decoded and parsed by the decoder parser 32/36. The electronic attachment 70 is then separated therefrom along with the user preferences 71. Similar to the first embodiment shown in FIG. 5a, the electronic attachment 70 and the user preference 71 are sent to the second processor 38 and are stored in the database 72. However, the first processor 30 also maintains a document storage database 78 within the first processor 30. An electronic attachment is processed by the third processor 40, which retrieves the electronic attachment directly from the data storage 78 of the first processor 30 and the user preferences 71 from the database 72 of the second processor 83. Once the third processor 40 has completed its processing, its poller 76 notifies the dispatcher 74 of the event. The dispatcher 74 of the second processor 38 then initiates the transmission of a second user preference 71 to the translation engine 44 which then retrieves the associated electronic attachment from the document storage 78 of the first processor 30.

Referring to FIG. 7c there is shown a third embodiment of the flow of the processing of the electronic attachments. Similar to the first embodiment shown in FIG. 7a, the electronic mail with the electronic attachment is first decoded and parsed with the electronic attachment 70 separated therefrom by the first processor 30. Thereafter, the separated electronic attachment 70 is sent to the second processor 38 along with the user preferences 71, to be stored together in a temporary storage file 80. From the second processor 38, the document with the user preference 71 is sent to a database 72, which is located in the third processor 40. The temporary storage 80 within the second processor 38 stores only one document. As it is moved to the database 72, it is stored in the database 72 of the third processor 40. From the database 72, each attachment 70 with its accompanying user preference 71 is sent to the translation engine 44 to be translated. As each document is so translated, the dispatcher 74 then sends another attachment with its user preference within the second processor 38 to the database 72 in the third processor 40.

Referring to FIG. 7d, there is shown a fourth embodiment of the flow of the processing of the electronic attachments. This embodiment is similar to the first and third embodiment shown in FIG. 7a and 7c, respectively. The email with the electronic attachment attached thereto is decoded and parsed with the electronic attachment 70 separated therefrom by the first processor 30. The documents 70 that are separated from the email are then stored in a document storage database 78 within the first processor 30. The user preferences 71 are then sent to the second processor 38 and along with the document handle are stored in a storage bin 80. The handle is simply a pointer to the location of the document. The file that has been separated from the e-mail is stored once, and thereafter the handle or the pointer to the location of the stored file is passed from one processing unit to another. The handles are stored in lists or queues and dispatched to the appropriate modules for processing based upon the file type and system loading. In a distributed system, many computers may only perform the same one type of task such as translating Microsoft Word 9.0 file to HTML 3.0 file. The queue manager attempts to keep all of these busy doing the right type of work.

The contents of the storage bin 80 are then supplied to the third processor 40 and are stored in a database 72. As the translation engine 44 requests each document from the document storage database 78, it also retrieves the corresponding user preferences from the database 72. Once the documents are translated by the translation engine 44, the dispatcher 74 then sends the contents of the storage bin 80 to the database 72.

It should be noted while the foregoing specification describes a translation computer 20 separate and apart from the server computer 26, it is also possible to practice the method of the present invention by having the server computer 26 execute appropriate computer usable medium having computer readable program code embodied therein to perform the steps described heretofore.

What is claimed is:

1. A method of electronically communicating between a device sending a first electronic message having an electronic attachment, having a content, to a receiver, wherein the first electronic message is sent by the device over a communication network to a server computer for storage thereon, and wherein the receiver operates a software to access said server computer to receive said first electronic message, wherein the method comprising:

retrieving said first electronic message with said electronic attachment by a computer;

opening said content of said first electronic attachment by said computer; and sending a second electronic message with said content of said electronic attachment embedded in said second electronic message to said receiver by said computer.

2. The method of claim 1 further comprising the step of:

storing said revised message on said server computer.

3. The method of claim 2 wherein said software is a browser.

4. The method of claim 1 wherein said receiver is a wireless device.

5. The method of claim 4 wherein said receiver is a telephone.

6. The method of claim 4 wherein said receiver is a PDA.

7. The method of claim 4 wherein said receiver is a pager.

8. The method of claim 1 further comprising the step of converting said electronic attachment into a format for said software.

9. The method of claim 1 further comprising the step of:

notifying said server computer by said receiver of the capabilities of said receiver.

10. A method of electronically communicating between a device and a receiver, wherein said method comprising:

sending by said device, a first electronic message with an electronic attachment having a content over a communication network to a server computer;

storing said first electronic message with said electronic attachment by said server computer;

retrieving said first electronic message with said electronic attachment by a computer;

opening said content of said electronic attachment by said computer; and storing a second electronic message with said content of said electronic attachment embedded in said second electronic message on said server computer for said receiver.

11. The method of claim 10 further comprising the step of:

retrieving said first electronic message with said electronic attachment by said receiver from said server computer; and retrieving said second electronic message with said electronic attachment by said receiver from said server computer.

12. The method of claim 10 wherein said receiver is a wireless device.

13. The method of claim 10 wherein said receiver is a telephone.

14. The method of claim 10 wherein said receiver is a PDA.

15. The method of claim 10 wherein said receiver is a pager.

16. An electronic system for use with a first communication network for receiving a first electronic message with an electronic attachment having a content, said system comprising:

a storage device for storing said first electronic message with said electronic attachment; and a computer for retrieving said stored first electronic message, for opening said content of said electronic attachment and for storing a second electronic message with said content of said electronic attachment embedded in said second electronic message, on said storage device.

17. The system of claim 16 further comprising:

a server computer for receiving said first electronic message from said communication network and for causing said storage device to store said first electronic message.

18. An article of manufacture comprising:

a computer usable medium having a computer readable program code embodied therein configured to cause a computer to retrieve a first electronic message with an electronic attachment, having a content, stored on a server computer for a receiver;

computer readable program code configured to cause a computer to open said content of said first electronic attachment; and computer readable program code configured to cause a computer to send a second electronic message with said content of said electronic attachment embedded in said second electronic message to said receiver.

* * * * *